(12) United States Patent
Talwar

(10) Patent No.: US 7,240,821 B2
(45) Date of Patent: Jul. 10, 2007

(54) METHOD FOR JOINING AT LEAST TWO ADJOINING WORK-PIECES BY FRICTION STIR AND/OR FRICTION STIR SPOT WELDING

(75) Inventor: Rajesh Talwar, Frontenac, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/187,551

(22) Filed: Jul. 21, 2005

(65) Prior Publication Data
US 2007/0017960 A1 Jan. 25, 2007

(51) Int. Cl.
B23K 1/00 (2006.01)
B23K 1/20 (2006.01)
B29C 65/06 (2006.01)

(52) U.S. Cl. .................. 228/175; 228/112.1; 156/73.5
(58) Field of Classification Search ................ 228/175, 228/112.1; 156/73.5
See application file for complete search history.

(56) References Cited

U.S. PATENT DOCUMENTS

| | | | | |
|---|---|---|---|---|
| 4,743,522 A | * | 5/1988 | Iino et al. | 430/58.1 |
| 6,247,633 B1 | * | 6/2001 | White et al. | 228/112.1 |
| 6,543,670 B2 | * | 4/2003 | Mahoney | 228/112.1 |
| 6,582,539 B2 | * | 6/2003 | Iwanczyk et al. | 156/73.5 |
| 6,676,007 B2 | * | 1/2004 | Stevenson et al. | 228/112.1 |
| 6,686,052 B2 | * | 2/2004 | Jogan et al. | 428/472.2 |
| 6,722,556 B2 | | 4/2004 | Schilling et al. | |
| 6,769,595 B2 | * | 8/2004 | Stol et al. | 228/112.1 |
| 6,800,157 B2 | * | 10/2004 | Tarbutton et al. | 156/73.5 |
| 6,905,060 B2 | * | 6/2005 | Van Aken et al. | 228/112.1 |
| 2004/0041006 A1 | * | 3/2004 | Masingale | 228/112.1 |
| 2004/0079787 A1 | * | 4/2004 | Okamoto et al. | 228/112.1 |
| 2004/0173662 A1 | * | 9/2004 | Christner | 228/112.1 |

FOREIGN PATENT DOCUMENTS

| | | |
|---|---|---|
| DE | 3815069 A1 | 11/1989 |
| JP | 2002001551 A | 1/2002 |
| JP | 2002178170 A | 6/2002 |
| WO | WO 2004014593 A1 | 2/2004 |

OTHER PUBLICATIONS

Talwar et al., "Laser Weldbonded Aluminum Structure", 28th Annual Meeting of the Adhesion Society, Feb. 14, 2005.
Westgate, S., "Weldbonding", TWI World Centre for Materials Joining Technology, 2001.
Feng, Z., "Friction Stir Spot Welding of Advanced High-Strength Steels—A Feasibility Study", 2005.
Hysol EA 9394—Epoxy Paste Adhesive—Data Sheet—Henkel Corporation.

* cited by examiner

Primary Examiner—Jonathan Johnson
(74) Attorney, Agent, or Firm—Ingrassia Fisher & Lorenz, P.C.

(57) ABSTRACT

A method for weldbonding at least two work-pieces together includes applying an adhesive to a first surface of a first work-piece, and bringing the first surface of the first work-piece into contact with a surface of a second work-piece. The first work-piece and second work-piece are then friction stir or friction stir spot welded together, and the adhesive is cured. The use of bonding tools to maintain the two work-pieces together during curing of the adhesive is eliminated.

19 Claims, 2 Drawing Sheets

METHOD FOR JOINING AT LEAST TWO ADJOINING WORK-PIECES BY FRICTION STIR AND/OR FRICTION STIR SPOT WELDING

BACKGROUND OF THE INVENTION

The present invention generally relates to friction stir welding and, more particularly, to the use of friction stir welding for the weldbonding process.

Friction stir welding is commonly used in joining two or more work pieces for various classes of materials, such as aluminum, magnesium, copper, titanium and steel. This method of welding in lap, L-joint and T-joint configurations leads to a small weld nugget size with notches on both sides of the weld nugget. Due to a higher stress concentration on either side of the weld nugget, these notches increase stress concentration factors, and reduce fatigue life.

Moreover, friction stir welding of two or more work-pieces does not seal gaps between these work-pieces as in adhesive bonding. The use of adhesive bonding is increasing dramatically as it eliminates drilling holes and installation of fasteners. It is highly desirable to replace fasteners, fusion, friction, and spot welded joints with adhesive bonded joints. Adhesive bonded joints spread loads more evenly and result in smooth surface conditions. In particular, adhesive bonding results in the elimination of stress risers at fasteners and weld locations. The automotive industry has used adhesive bonding of auto parts to increase surface finish, increase structural damping, and eliminate failure of spot welds which results in vibration noise. However, adhesive bonding of complex curvature structures is quite expensive because specialized bonding tools are required to apply pressure during curing of the adhesive. Furthermore, at room temperature, the curing of adhesive can take several days.

Weldbonding is a hybrid method of assembly that utilizes both the welding and adhesive bonding processes. Edison Welding Institute (EWI), Columbus, Ohio, developed a process using adhesive bonding accompanied or followed by laser welding. Laser weldbonding has been used on small airframe structures such as small commuter aircraft fuselages. However, laser weldbonding requires expensive equipment and the quality of the laser welds is poor. For example, laser weldbonding is difficult to use on aluminum structures, and the success of the laser weldbond depends greatly on the aluminum alloy the structure is comprised of. The auto industry has used adhesive bonding with fusion spot welding of steel. However, fusion welding of aluminum, which is used in new generation cars, is quite difficult and costly. In addition, fusion spot welding uses electrodes which creates surface indentation on both upper and lower surfaces, resulting in poor surface conditions. The fusion weld also causes adhesive to splatter, thus reducing bond quality.

As can be seen, an inexpensive and effective weldbonding process is needed that will maintain two or more work-pieces together and apply pressure during curing of an adhesive without the use of any bonding tools, and will result in smooth surface conditions and evenly sealed joints for a variety of materials.

SUMMARY OF THE INVENTION

The present invention fulfills the above-described need by providing an improved method of joining at least two work-pieces together via friction stir welding combined with adhesive bonding.

In one aspect of the present invention, a method includes applying an adhesive to the first surface of a first work-piece, and bringing the first surface of the first work-piece into contact with a surface of a second work-piece. The first work-piece and second work-piece are then friction stir welded together.

In another aspect of the present invention, a method for forming a weldbonded structure comprises applying a paste or other adhesives to a first surface of a first aluminum work-piece, and bringing the first surface of the first aluminum work-piece into contact with a first surface of a second aluminum work-piece. The first work-piece and the second work-piece are friction stir or friction stir spot welded together, and the adhesive is cured at room temperature or higher temperature.

In a further aspect of the present invention, a method is provided for weldbonding at least two work-pieces together for use in an aircraft, automotive and other products. The method includes applying an adhesive to a first surface of a first work-piece, and bringing the first surface of the first work-piece into contact with a first surface of a second work-piece. The first work-piece and the second work-piece are then friction stir welded together, and the adhesive is cured. No bonding tools are used to maintain the two work-pieces together during curing of the adhesive. These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The method of the present invention is suitable for, but not limited to, applications in the aerospace industry, shipbuilding and marine industries, railway industries, automobile industry, and construction industry. For example, the method of the present invention may be used to weld work-pieces together for use in military and civilian aircraft, such as welding skins to spars, ribs, and stringers. In addition, the method of the present invention may be used to produce longitudinal butt welds, lap welds, spot welds, tapered butt welds, and 5-axis contour welds.

The method of the present invention utilizes friction stir welding to stitch or hold two or more work-pieces together during curing of an adhesive. Accordingly, the adhesive bonding process is made much more affordable due to the elimination of bonding tools. In addition, the method of the present invention results in improved surface quality of welded components because the friction stir welding process typically welds from one side in contrast to the two sided welding used for the spot welding. The method of the present invention further provides improved adhesive bonding quality, lower interface stresses, and improved cycle time.

Figure 1:
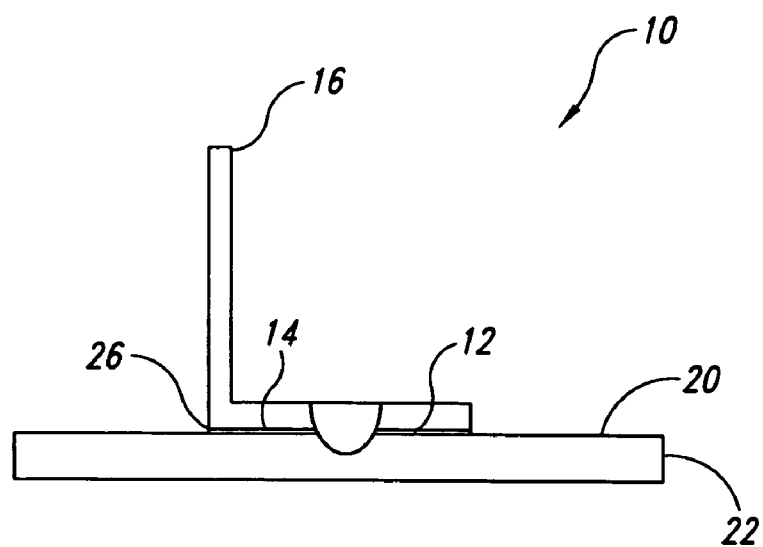
FIG. 1 is a cross sectional view of two work-pieces welded together in accordance with an embodiment of the present invention.

Referring to FIG. 1, shown is a weldbonded structure 10 made in accordance with a method of the present invention. The method of the present invention includes applying an adhesive 12 to a first surface 14 of a first work-piece 16 to form an adhesive layer. The adhesive 12 may be applied to the first surface 14 of the first work-piece 16 via any method known to those skilled in the art including, but not limited to spraying, or application with a brush, roller or spatula. The adhesive 12 may be any adhesive that is effective in bonding two surfaces together. For example, suitable adhesives for use in the present invention include, but are not limited to paste or film adhesives. Preferably, the adhesive 12 is a paste adhesive such as Hysol® EA 9394 manufactured by Henkel Corporation, Bay Point, Calif.

The first surface 14 of the first work-piece 16 is brought into contact with a first surface 20 of a second work-piece 22. For example, the surfaces 14 and 20 of the first work-piece 16 and the second work-piece 22, respectively, may be maintained in contact with one another through the use of a clamp, fastener or similar device.

The first work-piece 16 and second work-piece 22 are then friction stir or friction stir spot welded together. If desired, the adhesive layer 12 may be cured at a temperature between approximately 20° C. and approximately 200° C. The adhesive layer 12 may be cured at room temperature for a period of about 1 day to about 30 days. The temperature and length of time used to cure the adhesive 12 will depend upon the type of adhesive used. It is not necessary to cure the adhesive at elevated temperatures, as in conventional adhesive bonding processes, because the friction stir weld effectively holds the surfaces 14 and 20, and work-pieces 16 and 22 together. Accordingly, the friction stir weld also eliminates the need for any bonding tools for maintaining two or more work-pieces 16 and 22 together and/or applying pressure during curing of the adhesive 12.

The combination of adhesive bonding and friction stir welding in the present invention results in smooth surface conditions near the weld joint, and also results in evenly and completely sealed joints between the work-pieces 16 and 22. Conventional friction stir welding and friction stir spot welding results in concentrated loads, especially at the edge of the welds (at notches). It is more desirable to fabricate structures by friction stir weldbonding because loads are distributed more evenly. Furthermore, in processes utilizing friction stir welding alone, the area or joint 26 where two or more work-pieces 16 and 22 meet is not completely sealed. As a result, a crevice may form in the area or joint 26 between the work-pieces 16 and 22, and collect moisture which causes corrosion of the work-pieces. This problem is avoided in the method of the present invention because the joint 26 between the work-pieces 16 and 22 is completely sealed by the adhesive layer 12 as illustrated in FIG. 1. The use of adhesive bonding in the method of the present invention also provides damping of vibration and noise in welded work-pieces 16 and 22.

Figure 2:
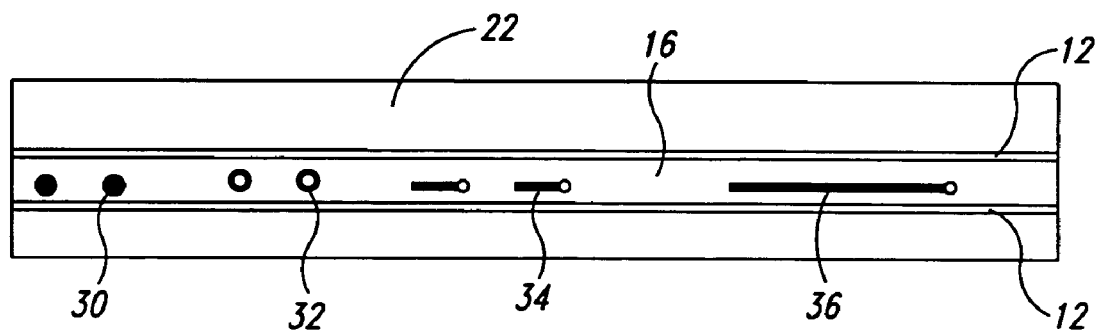
FIG. 2 is a top view of two work-pieces welded together in accordance with alternative embodiments of the present invention.

Various friction stir welding processes may be used in the method of the present invention. Specifically, friction stir spot welding, segmented friction stir welding and continuous friction stir welding may be utilized in the method of the present invention. Examples of welds formed by these welding techniques are illustrated in FIG. 2, namely friction stir spot welds (with no tool exit hole) 30, friction stir spot welds (with tool exit hole) 32, segmented friction stir welds 34, and a continuous friction stir weld 36.

During the process of friction stir welding, which includes continuous and segmented friction stir welding, a tool with a specific geometry is plunged into, and traversed through the material to be welded. The tool's key components are a shoulder and pin (or probe). During welding, the pin travels in the material along a joint line, while the shoulder rubs on the surface of the material. Heat is generated by the tool shoulder rubbing on the surface and by the pin mixing the material below the shoulder. This mixing action permits material to be transferred across the joint line. Process variables may include rotation and travel speeds, tool design, orientation, position and tool forging load.

Figure 3A:
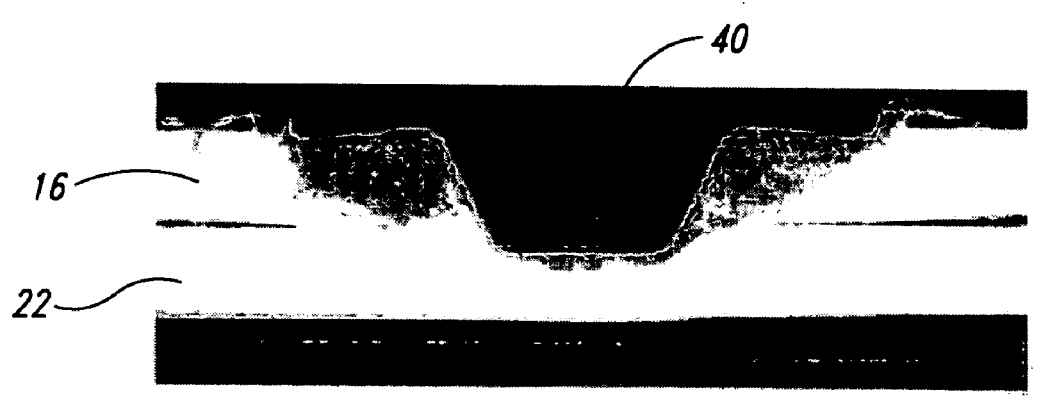
FIGS. 3a and 3b are cross sectional views of two work-pieces welded together via friction stir spot welding techniques used in accordance with alternative embodiments of the present invention.
Figure 3B:
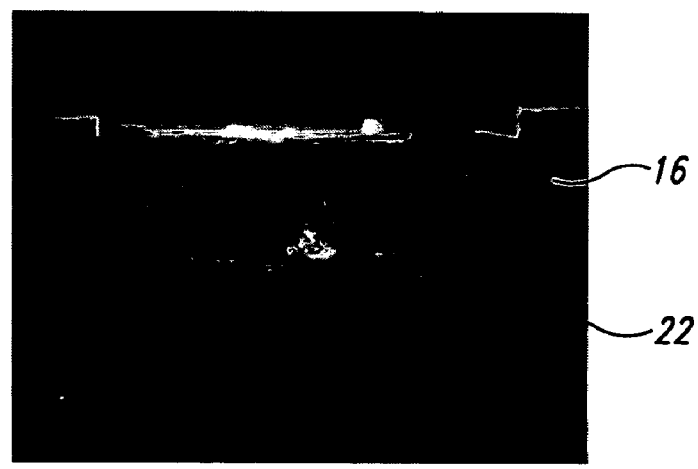

During the process of friction stir spot welding, the friction stir welding tool is plunged into and retracted from the material to be welded, without traversing through the material. In one technique, the friction stir spot weld is formed with a tool exit hole 40 in the work-pieces 16 and 22, as shown in FIGS. 2 and 3a. Alternatively, the friction stir spot welding process may be performed without leaving an exit hole 40 in the work-pieces 16 and 22, as illustrated in FIGS. 2 and 3b. An example of this alternative method, in which the tool exit hole 40 is filled, is described in U.S. Pat. No. 6,722,556 to Schilling et al. Any friction stir spot welding process, including those described above, may be used in the friction stir weldbonding method of the present invention.

The method of the present invention may be used to effectively weld various materials, including but not limited to aluminum, steel, copper, bronze, inconel, lead, magnesium, titanium, and alloys thereof.

It should be understood, of course, that the foregoing relates to exemplary embodiments of the invention and that modifications may be made without departing from the spirit and scope of the invention as set forth in the following claims.

We claim:

1. A method for weldbonding at least two work-pieces together comprising the steps of:
    applying a curable aerospace grade adhesive to a first surface of a first work-piece;
    bringing the first surface of the first work-piece into contact with a first surface of a second work-piece;
    creating a plurality of discontinuous friction stir welds by discontinuously friction stir welding the first work-piece to the second work-piece, wherein the discontinuous welds are tack welds having a low shear strength, and wherein the discontinuous welds prevent movement of the first work-piece in regard to the second work-piece and hold the first surface of the first work-piece in contact with the first surface of the second work-piece during curing;
    curing the adhesive below approximately 200° F.; and
    creating a joint having a shear strength of about 4,200 psi at room temperature by bonding the first surface of the first work-piece to the first surface of the second work-piece with the cured adhesive, wherein the adhesive carries the load of the created joint.

2. The method of claim 1, wherein the first work-piece and the second work-piece are welded via segmented friction stir welding.

3. The method of claim 1, wherein the first work-piece and the second work-piece are welded via friction stir spot welding.

4. The method of claim 1, wherein the adhesive is selected from the group consisting of paste adhesives and film adhesives.

5. The method of claim 4, wherein the adhesive is a paste adhesive.

6. The method of claim 1, wherein the first work-piece and the second work-piece are comprised of a material selected from the group consisting of aluminum, steel, copper, bronze, inconel, magnesium, titanium, or alloys thereof.

7. The method of claim 6, wherein the first work-piece and the second work-piece are comprised of an aluminum alloy.

8. The method of claim 1, wherein a butt weld, lap weld, spot weld or contour weld is formed between the first work-piece and the second work-piece.

9. The method of claim 1, wherein the adhesive is applied via a brush, a spatula, roller, or spraying.

10. A method for forming a weldbonded structure comprising the steps of:
    applying a curable two-part structural paste adhesive to a first surface of a first metal work-piece;
    bringing the first surface of the first metal work-piece into contact with a first surface of a second metal work-piece;
    tacking the first work-piece to the second work-piece with a plurality of spot welds created by friction stir spot welding, wherein the spot welds are tack welds having a low shear strength, and wherein the spot welds prevent movement of the first work-piece in regard to the second work-piece and hold the first surface of the first work-piece in contact with the first surface of the second work-piece during curing;
    curing the adhesive at room temperature; and
    creating a joint between the first work-piece and the second work-piece by bonding the first surface of the first work-piece to the first surface of the second work-piece with the cured adhesive, wherein the adhesive carries the load of the created joint, and wherein the joint has a shear strength of about 4,200 psi at room temperature.

11. The method of claim 10, wherein the friction stir weld and paste adhesive form a completely sealed joint between the first work-piece and the second work-piece.

12. The method of claim 11, wherein the paste adhesive forms an adhesive layer located between the first work-piece and the second work-piece, and the adhesive layer prevents moisture from collecting in the joint between the first work-piece and the second work-piece.

13. The method of claim 11, wherein the weldbonded structure has noise and vibration damping properties.

14. The method of claim 10, wherein the adhesive is cured for a period of approximately 3 days to approximately 5 days.

15. A method for weldbonding at least two work-pieces together for use in the aerospace industry comprising the steps of:
    applying an aerospace grade epoxy paste adhesive to a first non-flat surface of a first work-piece;
    bringing the first surface of the first work-piece into contact with a first non-flat surface of a second work-piece;
    holding the first surface of the first work-piece and the first surface of the second work-piece in contact and preventing movement of the first work-piece in regard to the second work-piece during curing by discontinuously friction stir welding the first work-piece to the second work-piece using a friction stir welding process selected from the group of friction stir spot welding and segmented friction stir welding, wherein the obtained discontinuous friction stir welds are tack welds having a low shear strength;
    curing the adhesive at a temperature below approximately 200° F.; and
    creating a joint between the first work-piece and the second work-piece having a shear strength of about 4,200 psi at room temperature by bonding the first surface of the first work-piece to the first surface of the second work-piece with the cured adhesive.

16. The method of claim 15, herein the first work-piece is a skin and the second work-piece is a spar, rib or stringer.

17. The method of claim 15, wherein the friction stir weld and paste adhesive form a completely sealed joint between the first work-piece and the second work-piece, and wherein the sealed joint prevents corrosion of the work-piece.

18. The method of claim 15, wherein the first work-piece and the second work-piece are manufactured out of aluminum and form a weldbonded structure having noise and vibration damping properties.

19. The method of claim 15, wherein the adhesive is cured at room temperature.

* * * * *